Dec. 6, 1949 H. E. ROSE, SR 2,490,281
MOBILE HAND-CONTROLLED JIG SAW
Filed Dec. 9, 1946 2 Sheets-Sheet 2
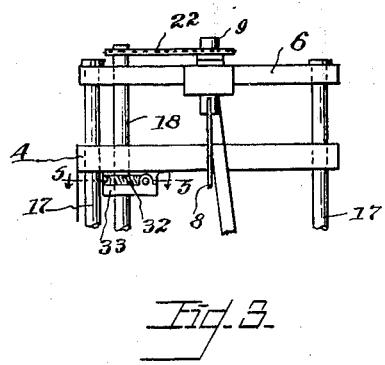
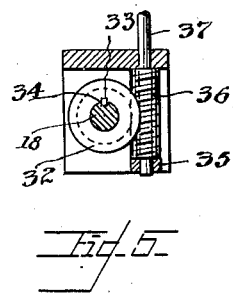
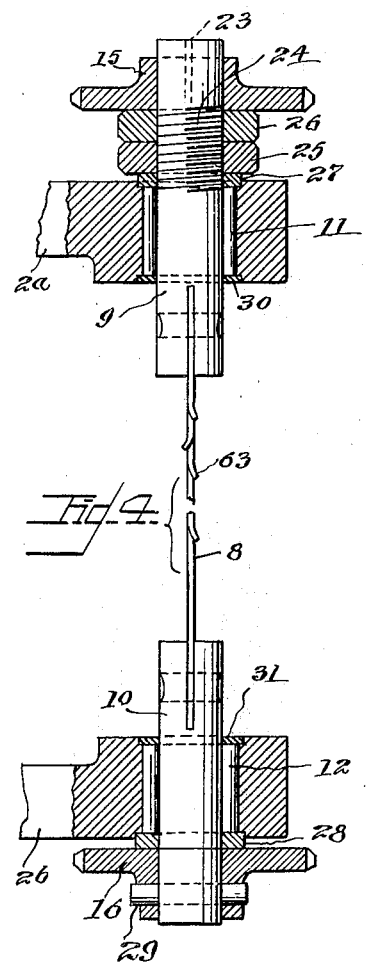
Inventor
Harry E. Rose, Sr.
By Francis D. Ammen
his Atty.

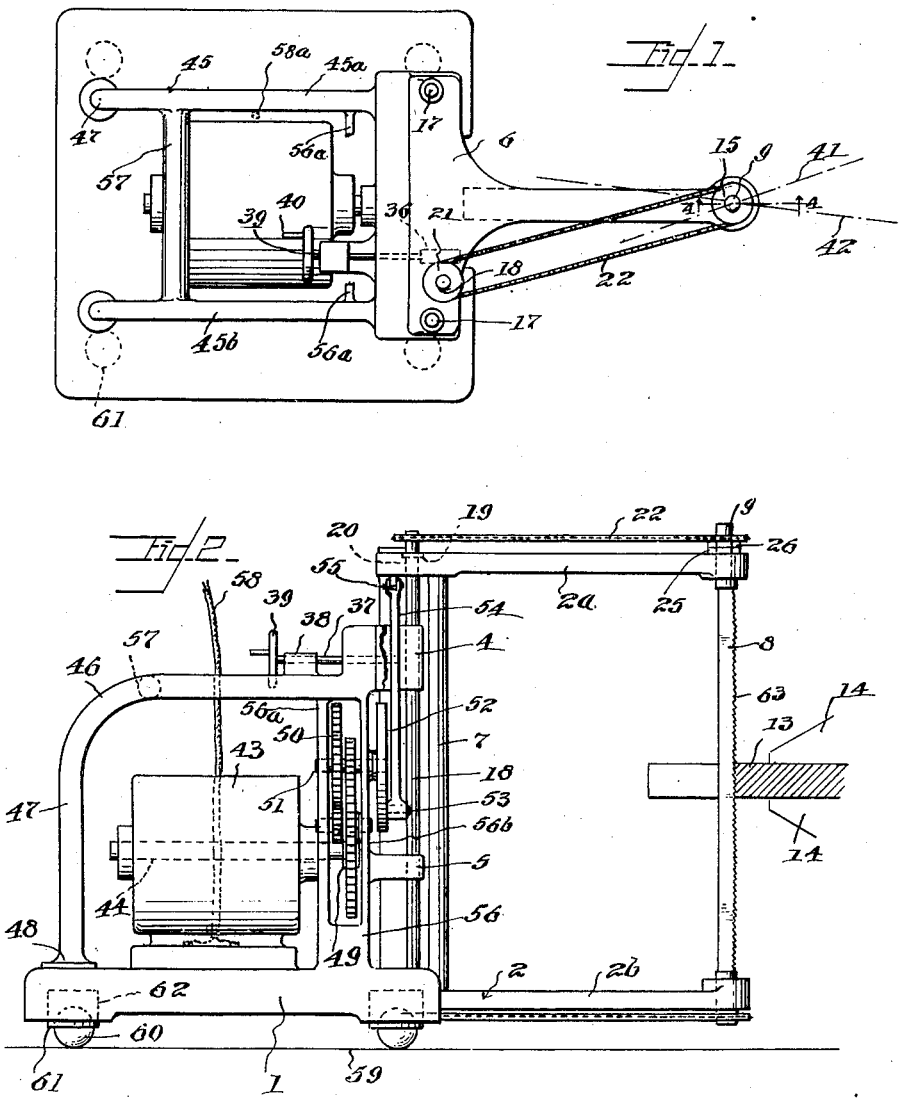

Patented Dec. 6, 1949

2,490,281

UNITED STATES PATENT OFFICE 2,490,281

MOBILE HAND-CONTROLLED JIG SAW

Harry E. Rose, Sr., North Hollywood, Calif.

Application December 9, 1946, Serial No. 714,947

3 Claims. (Cl. 143—71)

This invention relates to a jig saw and its controlling mechanism. The type of jig saw to which this invention is applied, is a mobile type of saw, which is adapted to be supported on a horizontal surface and moved about by the hand of the operator or sawyer. Although this small machine is pushed or pulled about by the hand of the operator, it is power-driven through the agency of a small electric motor supported on the base or frame of the machine. Today it is common practice to employ relatively large fixed sawing machines for performing jig saw operations, such as involve cutting along curved lines. These machines are large machines standing on the floor in a fixed position, and when a board is being cut along curved lines, it is necessary sometimes to have several men supporting the board and moving it about by hand into different positions, to enable the saw to cut along the marked line on the board.

One of the objects of this invention is to provide a small mobile power-operated jig saw that is so constructed as to enable it to be supported and moved about on a horizontal surface by a man operating it, and having handle means particularly adapted for enabling the sawyer to apply forces from his hands to the machine in a way which will facilitate the effective control of the machine, to exert force upon the saw-blade substantially in the plane of the saw-blade and back of the blade, so as to urge it forward along the cutting line. To this end, certain features of the invention relate to the handle means, and the arrangement of the same with respect to the motor and the driving mechanism that is driven by the motor for reciprocating the saw-frame.

The jig saw to which I have applied my invention, includes a pair of substantially parallel arms that form part of the reciprocating saw-frame, and the forward ends of these arms are provided with swivel heads for attachment to the ends of the saw-blade, so as to enable the blade of the saw to be set into different angular positions with respect to the fore-and-aft axis of the entire machine. One of the objects of this invention is to provide means for effecting the angular adjustment of the saw-blade while the jig saw is cutting along the cutting line, and to construct this control mechanism in such a way that the manually operated part can transmit the angular adjustment to the swivel heads of the saw-blade, but in which the means for transmitting this adjustment movement, will hold itself in any position in which it is set; in other words, while the hand-controlled part for controlling the angular position of the swivel heads, is capable of moving the swivel heads into any adjusting movement, the swivel heads can not impart any movement back to the hand-controlled part that controls them.

Another object of the invention is to provide an organization of parts of this machine, so that the force developed upon the frame of the machine by the operation of the saw, will not in the ordinary operation of the saw, tend to tilt the frame of the machine out of its normal horizontal position which it has when being rolled around on the surface that supports it; and to accomplish this regardless of the fact that the saw-frame presents a considerable amount of over-hang beyond the forward portion of the main frame of the machine.

Further objects of the invention will appear hereinafter.

The invention consists of the novel parts and combinations of parts to be described hereinafter, all of which contribute to produce an efficient mobile hand-controlled jig saw.

A preferred embodiment of the invention is described in the following specification, while the broad scope of the invention is pointed out in the appended claims.

In the drawing:

Fig. 1 is a plan of the jig saw machine to which my invention has been applied. In this view, however, certain parts of the framing are broken away, and portions of the driving mechanism are omitted.

Fig. 2 is a side elevation of the machine illustrated in Fig. 1, upon a slightly enlarged scale, and in this view the piece of work being sawed by the saw, is illustrated as though clamped in a fixed position above the horizontal surface on which the machine may be moved about by hand in cutting along the cutting line. A certain part is broken away.

Fig. 3 is a front elevation of the upper portion of the machine illustrated in Fig. 1, particularly illustrating the means for transmitting the swivel adjusting movement to the saw-blade to change at will, the angular relation of the plane of the saw-blade while the saw-blade is making the cut. In this view, of course the lower portion of the machine is broken away.

Fig. 4 is a vertical section taken about on the line 4—4 of Fig. 1, passing through the swivel heads for supporting the saw-blade. The scale of this view is substantially full size.

Fig. 5 is a horizontal section taken about on the line 5—5 of Fig. 3, further illustrating the mechanism for imparting the adjusting movement to the swivel heads of the saw-blade.

Referring particularly to Figs. 1 and 2, the jig saw machine in which I have illustrated my invention as embodied, includes a base 1, the forward portion of which is formed with guiding means for guiding a reciprocating saw-frame 2. This guiding means comprises oppositely disposed forwardly projecting extensions 4 and 5, which are disposed in pairs, respectively, at an upper level and at a lower level (see Fig. 2). The saw-frame 2 preferably comprises an upper saw-arm 2a and a lower saw-arm 2b, and these arms are formed, respectively, with cross heads such as the cross head 6 shown in Fig. 1. These cross heads are connected by a vertical post 7. The forward ends of the arms 2a and 2b support the jig saw blade 8. The ends of this blade are secured to saw heads 9 and 10 (see Fig. 4), so as to enable the blade to swivel on a vertical axis. To this end, these heads 9 and 10 are mounted to swivel in bearings 11 and 12, which are illustrated as roller bearings, although this is not essential.

In accordance with my invention, I provide means for adjustably orienting these heads 9 and 10 so as to orient the blade of the saw to coincide with the direction of the marked cutting line on the work, such as a board, the edge 13 of which is illustrated in Fig. 2, secured between jaws 14 of a clamp. In order to accomplish this, I prefer to provide the upper end of the swivel head 9 with a sprocket wheel 15, and I provide the lower end of the head 10 with a sprocket wheel 16.

In addition to the post 7 that connects the arms 2a and 2b, they are also connected by two guide bars 17 (see Figs. 1 and 3). However, these guide bars are omitted in Fig. 2, because they would confuse the illustration. They are located toward the ends of the cross heads 6, and they are guided to slide vertically through the extensions 4 and 5. See Fig. 3, which illustrates them guided through the upper extensions 4.

In addition to the guide bars 17, a vertically disposed driving shaft 18 is mounted at its ends in the cross heads 6, for rotation therein, and this shaft is held against longitudinal movement up or down with respect to the saw-frame 2, by means of collars such as the countersunk collar 19 that is illustrated in Fig. 2, as countersunk into the upper side of the cross head 6. These collars 19 seat against slight annular shoulders located at points such as 20.

The ends of the shaft 18 project above and below the arms 2a and 2b, respectively, and carry sprocket wheels such as the sprocket wheel 21, and these sprocket wheels carry sprocket chains 22 that extend over and around the aforesaid sprocket wheels 15 and 16. The upper sprocket wheel 15 may be attached to the upper swivel head 9 by a suitable driving key 23. Below the location of the sprocket wheel 15, the body of the swivel head 9 is formed with a screw thread 24, to receive a nut 25 below, and a check nut 26, above the nut 25. The lower nut 25 seats on a collar 27 that is countersunk into the upper face of the end of the arm 2a. This collar operates as a bushing and a retainer for the rollers if the bearings 11 and 12 include rollers. The lower sprocket wheel 16 seats against a retainer collar or bushing 28 for the lower ends of the rollers of the bearing 12, and this sprocket wheel may be secured to the lower end of the swivel head 10, by a cross pin 29.

Countersunk collars 30 and 31 are employed at the inner ends of the bearings 11 and 12.

Referring particularly to Figs. 1, 3, and 5, the shaft 18 slides freely through a worm wheel 32, and is provided with a feather or spline 33 that slides freely in a keyway 34 that extends longitudinally along the shaft. This worm-wheel is retained in a socket formed for it on the under side of the bearing extension 4 and above a bottom shelf that supports the worm wheel on its under side. The material of this shelf is formed with an upwardly disposed extension or ear 35 that operates as an outboard bearing for a worm 36. This worm is rigidly secured on an operating shaft 37. This worm of course meshes with the worm wheel as indicated clearly in Fig. 5. The rear end of this worm shaft 37 is carried in a suitable bearing 38 at the upper portion of the frame of the machine, and to the rear of this bearing a suitable hand wheel 39 is mounted on the shaft, and if desired, this hand wheel may be provided with a small handle 40 that can be grasped by the operator's fingers. By rotating the shaft 37 in either direction, the swivel heads 9 and 10 that hold the saw-blade 8, can be adjusted through any desired angle, so that the blade of the saw could lie in different planes, such as those indicated by the dotted lines 41 and 42 in Fig. 1.

In accordance with my invention, I provide a small electric motor 43 mounted on the base 1 and preferably disposed with its shaft 44 in a horizontal position, and extending longitudinally of the medial axial plane of the machine; and over this motor I provide handle means 45, which not only operates as a handle, but also operates as a guard over the motor. This handle means comprises two substantially horizontal bars 45a and 45b, the rear ends of which are connected by integral bends 46, respectively, with columns or posts 47 that extend down and are secured at their bases 48 to the upper side of the base 1. A pinion 49 on the motor shaft, drives reduction gearing 50, including a shaft 51 which extends toward the saw-frame, and which carries a crank disc 52. This crank disc has a crank pin 53 connected by a connecting rod 54 to an ear or lug 55 that extends down from the cross head 6. With this arrangement it will be evident that when the motor is driving its shaft, the saw-frame 2 will be reciprocated in a vertical plane.

The guiding means for the guide bars 17 of the saw-frame 2, is supported on an upright extension 56 that extends up from the base 1, and the upper portion of this extension is formed into two webs 56a and 56b that support the shaft 51 and the reduction gearing 50 already described. As indicated, the reduction gearing is preferably located between these two webs, and the crank disc 52 seats against the forward side of the web 56b.

Referring again to the handle means 45, it should be said that this handle means includes a handhold 57 which connects the side bars 45a and 45b of the handle means, and this handhold is located preferably at, or in, the vicinity of the junction between the bends 46 and the horizontal extensions 45a and 45b.

As illustrated in Fig. 2 (but omitted in Fig. 1) the electric motor may be supplied with operating electric current through an electric cord 58, and this cord passes down in the rectangle defined by the cross web 56a, the two side bars 45a, and the handhold 57. In this way, the handle means cooperates as a guide for the electric cord, which is preferably suspended from above. In Fig. 1, I have also illustrated the location of this cord in this rectangle, by the dotted lines at 58a. In connection with Fig. 1, it will be noted that in this figure, the web 56a is represented as broken away at its middle portion.

In order to increase the ease of movement of the machine around on a supporting surface indicated by the line 59, I prefer to mount the base 1 on a plurality of hard steel balls 60, which are carried in retainers 61 received in sockets 62 formed in the lower face of the base. The teeth 63 of the saw-blade 8, incline downwardly so that the saw cuts on the down stroke. This is advantageous as co-operating with the manner of attaching of the blade so that the teeth cut on the up stroke, because the weight of the motor as illustrated, located as it is toward the rear of the machine, cooperates in steadying the frame of the machine. This steadying effect, however, is needed more on the up stroke of the saw than on the down stroke, because on the up stroke, any resistance to movement of the blade in the cut, develops tension in the part of the blade that is located above the work 13, and this force of course would exert itself in a direction to lift the rear end of the frame.

The location of the posts 47, as they are, near the rear end of the base, is also most advantageous, because this gives an advantageous point for the operator of the machine to exert a downward pressure to advantage in holding the machine down on the surface 59, so as to resist any tendency of the rear end of the machine to rise off the table surface 59. However, the machine can be used quite effectively with the saw-blade in a reverse position, so that it cuts on the up stroke. This direction of cutting has some advantage, in that the sawdust does not accumulate on the upper face of the work in a manner that might interfere with the visibility of the cutting line scribed or drawn on the upper surface of the work.

The location of these posts 47 over toward the sides of the base, is also advantageous because it enables a force to be applied more nearly in line with a cutting line that is coinciding for the time being, with any inclined line, such as the lines 41 and 42 indicated in Fig. 1. However, the side bars 45a and 45b also cooperate in this functioning of the machine. While a cut is being taken, the operator can readily maintain a finger contact with the handle 40 of the hand wheel 39, to control the direction or plane in which the blade 8 of the saw extends, and this is most advantageous in cutting around relatively sharp curves, or curves of relatively small radius.

By reason of the employment of the worm for imparting the orienting movement to the swivel heads 9 and 10, of course the worm holds the swivel heads securely in any position to which they have been oriented.

Many other embodiments of the invention may be resorted to without departing from the spirit of the invention.

I claim as my invention:

1. In a mobile hand-propelled power-driven jig saw, the combination of a main frame having a base adapted to be supported on a substantially horizontal surface and moved about thereon, a saw-frame having a pair of arms for carrying the saw-blade, said main frame having guiding means for guiding the saw-frame for reciprotion in a substantially vertical plane, a pair of saw heads with swivel bearings in said arms adjacent the extremities thereof having means for attaching the ends of the saw blades to the same, a motor mounted on said base, mechanism connected to the saw frame for reciprocating it, means including a handle supported on said base at the side of said motor remote from said driving mechanism, means for orienting said heads into different adjusted positions; and a control member therefor supported in an elevated position above the motor and adjacent to said handle means.

2. A mobile hand-propelled power-driven jig saw according to claim 1, in which the said orienting mechanism includes a rotatable part adapted to be rotated by the sawyer's hand, capable of transmitting rotary movement to the swiveled heads but incapable of being rotated by forces acting upon the saw blade and tending to rotate the swivel heads.

3. A mobile hand-propelled power-driven jig saw according to claim 1, in which the said orienting mechanism includes a worm with means enabling the same to be rotated by the sawyer's hand, and a worm-wheel meshing with said worm for imparting rotary movement to said swiveled saw heads.

HARRY E. ROSE, Sr.

REFERENCES CITED

The following references are of record in the file of this patent:

UNITED STATES PATENTS

| Number | Name | Date |
|---|---|---|
| 91,900 | Blackstock | June 29, 1869 |
| 118,041 | Moore | Aug. 15, 1871 |
| 1,418,644 | Hawley | June 6, 1922 |
| 2,175,499 | Wodack et al. | Oct. 10, 1939 |
| 2,307,519 | Lefke | Jan. 5, 1943 |

FOREIGN PATENTS

| Number | Country | Date |
|---|---|---|
| 265,550 | Germany | Oct. 9, 1913 |
| 629,246 | France | July 19, 1927 |
| 458,715 | Germany | Apr. 19, 1928 |
| 334,384 | Great Britain | Sept. 4, 1930 |